United States Patent
Moenkhaus et al.

(10) Patent No.: US 7,766,037 B2
(45) Date of Patent: Aug. 3, 2010

(54) ADJUSTABLE SHUTOFF VALVE

(75) Inventors: Patrick R. Moenkhaus, Mounds View, MN (US); Scott O'Leary, Maple Grove, MN (US)

(73) Assignee: Honeywell International, Inc., Morristown, NJ (US)

(*) Notice: Subject to any disclaimer, the term of this patent is extended or adjusted under 35 U.S.C. 154(b) by 522 days.

(21) Appl. No.: 11/880,909

(22) Filed: Jul. 25, 2007

(65) Prior Publication Data

US 2009/0026396 A1 Jan. 29, 2009

(51) Int. Cl.
*F16K 31/02* (2006.01)

(52) U.S. Cl. .............. 137/556.3; 251/129.18; 251/129.19; 251/285; 335/258

(58) Field of Classification Search ........... 251/129.18, 251/129.19, 285; 335/258; 137/553, 556, 137/556.3
See application file for complete search history.

(56) References Cited

U.S. PATENT DOCUMENTS

| 1,175,864 | A | * | 3/1916 | Gold | 251/129.02 |
|---|---|---|---|---|---|
| 1,822,668 | A | * | 9/1931 | Protzeller | 251/129.18 |
| 3,742,785 | A | * | 7/1973 | Buck et al. | 123/376 |
| 3,805,203 | A | * | 4/1974 | Deckard | 335/258 |
| 4,530,486 | A | * | 7/1985 | Rusnak | 251/129.18 |
| 4,635,683 | A | * | 1/1987 | Nielsen | 251/129.18 |
| 5,204,652 | A | * | 4/1993 | Baker et al. | 335/258 |
| 6,659,421 | B1 | * | 12/2003 | Goossens | 251/129.18 |
| 7,543,604 | B2 | | 6/2009 | Benda | |
| 7,624,755 | B2 | | 12/2009 | Benda | |

* cited by examiner

*Primary Examiner*—John Bastianelli
(74) *Attorney, Agent, or Firm*—Hollingsworth & Funk, LLC

(57) ABSTRACT

A gas valve assembly includes a solenoid coil, a linearly actuated plunger, and a stop member. The plunger is disposed in the coil so that a gap exists between the plunger and the stop member at a deenergized condition of the solenoid. The assembly includes a valve having a port and a closing member. The closing member blocks the port in a closed position corresponding to the de-energized condition of the solenoid, and slidably unblocks the port in an open position corresponding to the energized condition of the solenoid. An adjustable length member is coupled to the closing member and the plunger and has a portion accessible external to the valve assembly. The externally-accessible portion of the adjustable length member is adjustable to vary the size of the gap between the plunger and the stop member when the closing member is in the closed position.

20 Claims, 4 Drawing Sheets

ADJUSTABLE SHUTOFF VALVE

FIELD OF THE INVENTION

This invention relates in general to industrial controls, and in particular to commercial burner/boiler gas shutoff valves.

BACKGROUND

Industrial heating, ventilation and air-conditioning (HVAC) systems often rely on gas powered combustion to produce heat. Such a system typically includes a burner or boiler to combust fuel such as natural gas. The heat from the combustion is used to heat a gas or liquid. The heated gas or liquid may be used in an HVAC system, or for some other purpose. For example, air may be directly heated and then forced through ducting. In another application, water can be heated and circulate through radiators for heating, and for other purposes (e.g., hot water for washing). Such burners may provide other functions besides HVAC, such as providing heat for manufacturing processes, co-generation of electricity, etc.

One key component on many industrial boilers and burners is a gas shutoff valve. A system may include at least one gas shutoff valve connected with a sensor or controller, such as a thermostat or thermocouple. The gas valve may be configured to open and close in response to the boiler conditions in order to maintain temperature or pressure within certain limits. Some valves are mechanically controlled by application of force or pneumatic pressure. However, an ever increasing number of these valves are electrically actuated, such as by means of a solenoid.

In many installations, the system designer or field engineer may need a valve to perform additional functions besides simply shutting off and on. For example, it may be desirable to throttle, or limit, the amount of gas flowing through the valve. An external adjustable valve may be added to the system to perform this throttling function, but the addition of a throttling valve adds cost and complexity to an installation. The connections required to add such a valve becomes another source of installation error and leaks, and may also add to inspection requirements during installation and in the future. Therefore it is desirable to provide a way to adjustably throttle a combustible fluid flow in systems such as industrial HVAC installations without installing an external throttling valve.

SUMMARY

The present disclosure relates to gas valve installations, in particular to electrically controlled gas valves suitable for industrial burner/boiler installations. In one embodiment of the invention, a gas valve assembly includes a solenoid having a coil, a linearly actuated plunger, and a stop member. The plunger is disposed in the coil so that a gap exists between the plunger and the stop member at a de-energized condition of the solenoid, and the stop member contacts the plunger at an energized condition of the solenoid. The valve assembly further includes a valve having a port and a closing member. The closing member is disposed to block the port in a closed position of the valve corresponding to the de-energized condition of the solenoid, and the closing member is disposed to slidably unblock the port in an open position of the valve corresponding to the energized condition of the solenoid. The valve assembly further includes an adjustable length member coupled to the closing member and the plunger. The adjustable length member has a portion accessible externally of the valve assembly. The externally-accessible portion is adjustable to vary a distance between the plunger and the closing member and thereby adjust a gap between the closing member and the port when the valve is in the open position. The externally-accessible portion may optionally be adjustable at the de-energized condition of the solenoid to vary the distance between the plunger and the closing member.

In a more particular embodiment, the adjustable length member includes a rotating portion and a fixed portion, and the rotating portion is coupled to the fixed portion via a screw thread. In such a case, the externally-accessible portion is adjustable by rotating the rotating portion relative to the fixed portion. In these particular embodiments, the valve assembly may further include an anti-rotation member coupled to the fixed portion. The anti-rotation member hits against one or more stops when the rotating portion is rotated relative to the fixed portion. In such a case, the anti-rotation member is visible externally to the valve assembly, the valve assembly further comprising a fixed scale proximate to the anti-rotation member, wherein the relative orientation between the anti-rotation member and the fixed scale provides an indication of a position of the closing member of the valve.

In another more particular embodiment, the adjustable member includes a coupling member coupled to move the closing member in a first direction. The first direction corresponds to a direction the closing member moves when transitioning from the closed position to the open position. The adjustable member also includes a first adjustable member fixably coupled to the coupling member, and a second adjustable member coupled to move the first adjustable member in both the first direction and a second direction opposite to the first direction. The second adjustable member is coupled to move the plunger only in the second direction, and the relative orientation between the first and second adjustable members in the first and second directions is manually adjustable externally to the gas valve assembly. In this particular embodiment, the gas valve assembly may include a compression spring disposed between the coupling member and the plunger, and in such a case, the coupling member may be decoupled from the closing member when the coupling member is moved in the second direction relative to the closing member. In such a configuration, the gas valve assembly may further include a gap between the coupling member and the closing member when the valve is in the closed position.

In other configurations of this particular embodiment, the coupling member may be decoupled from the closing member when the coupling member is moved in the second direction. In another configuration, the second adjustable member may includes a sleeve, and the first adjustable member includes a rod axially disposed in the sleeve; the sleeve and rod are coupled via screw threads. In such a case, the relative orientation between the first and second adjustable members in the first and second directions may be adjustable by rotating the sleeve relative to the rod around an aligned longitudinal axis of the sleeve and the rod. Further in such a case, the valve assembly may include an anti-rotation member coupled to the coupling member. The anti-rotation member hits against one or more stops when the sleeve is rotated relative to the rod, and the anti-rotation member may be visible externally to the valve assembly, the valve assembly further comprising a fixed scale proximate to the anti-rotation member, wherein the relative orientation between the anti-rotation member and the fixed scale provides an indication of a position of the closing member of the valve.

In another embodiment of the invention, an apparatus couples a shutoff valve to a solenoid, and includes a coupling member configured to couple with a closing member of the shutoff valve so that the closing member moves in a first direction when the first coupling member is moved in the first direction. The first direction corresponds to a direction the shutoff valve moves transition from a closed position to an open position of the shutoff valve. The first coupling member and the closing member are decoupled when the first coupling member is moved in a second direction opposite of the first direction. The apparatus includes a first adjustable member coupled to the coupling member so that the coupling member moves in the first direction when the first adjustable member is moved in the first direction. The valve includes a second adjustable member coupled to move the first adjustable member in both the first direction and a second direction opposite to the first direction. The second adjustable member is coupled to move the plunger only in the second direction, and the relative orientation between the first and second adjustable members in the first and second directions is manually and externally adjustable.

In a more particular embodiment, the plunger is decoupled from the coupling member when the plunger is moved in the first direction. In such a case, a compression spring may be disposed between the coupling member and the plunger, and the coupling member may be decoupled from the closing member when the coupling member is moved in the second direction.

In another more particular embodiment, the second adjustable member includes a sleeve, and the first adjustable member includes a rod axially disposed in the sleeve. In such a configuration, the rod may be coupled to the sleeve via a screw thread, and the relative orientation between the first and second adjustable members in the first and second directions is adjustable by rotating the sleeve along a longitudinal axis of the sleeve relative to the rod.

In another embodiment of the invention, a method of adjusting a shutoff valve involves accessing an adjustable length member that couples a movable valve closing member of the shutoff valve with a solenoid plunger. The adjustable length member is accessible without requiring disassembly of the shutoff valve, and the shutoff valve includes a coil that causes the solenoid plunger to move in the direction of a stop member when the coil is activated. The method further involves actuating the adjustable length member by hand. Actuation of the adjustable length member causes a change in the size of a gap between the plunger and the stop member when the closing member is in a closed position of the valve. Actuating the adjustable length member by hand further causes an increase in a distance between the solenoid plunger and the valve closing member. The method may optionally involve actuating the valve before actuating the adjustable length member, and in such a case actuating the adjustable length member further involves viewing an external indicator that moves with the movable valve closing member.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a solenoid driven, gas shutoff valve with adjustable throttling. An adjustment mechanism allows for changing a fluid flow gap of the valve elements in the valve's open position without adversely affecting the magnetic coupling between a solenoid coil and solenoid plunger that drives the valve disc. This allows the solenoid plunger, when energized, to maintain its fully pulled-in position regardless of the adjusted limit of the valve passageways. This provides benefits such as optimizing the available force, minimizing required power to the solenoid, and minimizing solenoid temperature rise.

Figure 1:
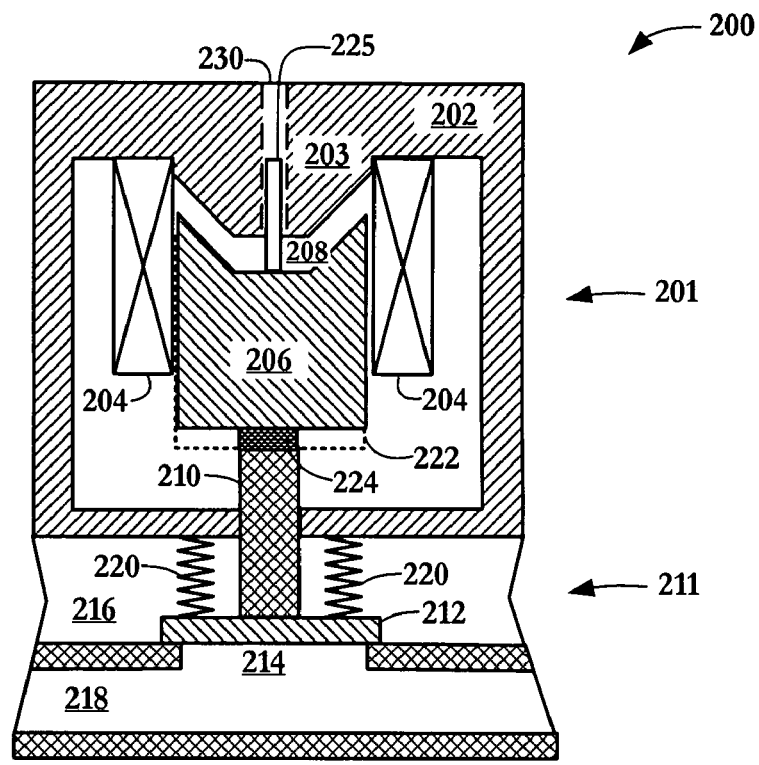
FIGS. 1-2 are cross-sectional block diagrams of a shutoff valve according to an embodiment of the invention.
Figure 2:
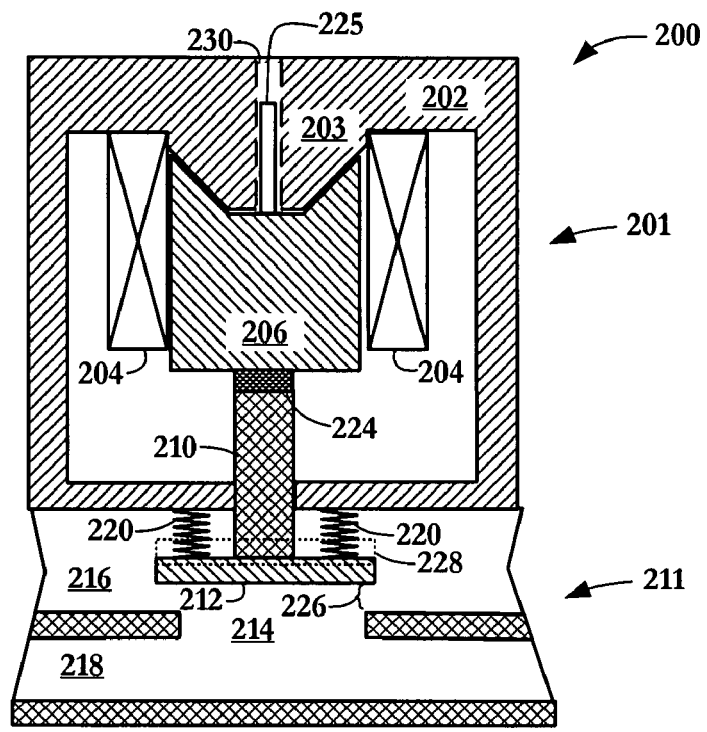

In reference now to FIGS. 1 and 2, cross sectional diagrams illustrate aspects of an adjustable throttled valve assembly 200 according to an embodiment of the invention. A solenoid 201 includes a solenoid housing 202 that contains a solenoid coil 204 and a solenoid plunger 206. A gap 208 is present between the plunger 206 and the housing 202 in a de-energized position of the solenoid valve 200. When the coil 204 is energized, it creates a magnetic force that causes the plunger 206 to move upward to close the gap 208, as seen in FIG. 2. The protrusion from the housing 202 near the gap 208, herein referred to as a stop member 203, may also be magnetic, and thereby transfer magnetic flux from the coil 204 to the plunger 206 to create a positive engagement of the plunger 206 in the energized position. The stop member 203 may be formed as part of the housing 202, or be fabricated as a separate piece that is attached to the housing 203.

The solenoid 201 is configured to selectably shut off a valve 211. The solenoid plunger 206 is coupled to a valve stem 210 that is itself coupled to a valve disk 212. The valve components 210, 212 are arranged as a poppet-type valve, such that the disk 212 interfaces with the edges of a valve port 214 to seal off fluid flow between chambers 216, 218. Springs 220 provide a holding force to seal off the port 214 when the valve assembly 200 is in the de-energized, closed position. The arrangement of the valve assembly 200 when the solenoid 201 is energized is seen in FIG. 2. The energized coils 204 pull upward on the plunger 206. The magnetic force of the solenoid 201 overcomes the forces of the spring 202 and pulls the disk 212 away from the port 214, and fluids (e.g., gases, liquids) can thereby flow between chambers 216, 218 via a gap 226 between the valve port 214 and disk 212.

In order to allow the valve 211 to be adjustably throttled, the valve assembly 200 includes a plunger 206 and disk 212 that can be adjustably located relative to each other such that the distance between the plunger 206 and the disk 212 is changed. In FIGS. 1 and 2, the valve assembly 200 is shown adjusted in a throttled configuration, as indicated by an increase in the plunger-to-disk distance represented by dashed line 222 and darkened portion 224 of the stem 210. Dashed line 222 indicates a maximum flow configuration of the valve 211, and darkened portion 224 indicates a difference from that configuration 211.

An externally accessible adjustable member 225 may facilitate adjusting the relative position between the plunger 206 and the disk 212. The adjustable member 225 may be incorporated as part of either or both of the plunger 206 and the valve stem 210, or may be an entirely independent component coupling an existing plunger 206 and stem 210 design. The adjustable member 225 may facilitate making throttling adjustments when the solenoid 201 is energized or de-energized, and when the valve portion 211 is respectively opened or closed In FIG. 1, the valve assembly 200 is shown in the de-energized, closed state, and the dashed line 222 represents an initial, unadjusted position of the plunger 206 corresponding to a minimum throttling/maximum valve travel configuration of the valve 200. In the illustrated configuration, the solenoid plunger 206 has been adjusted from this initial position 222 so that the top of the plunger 206 is closer to the stop member 203 by the distance indicated by the darkened portion 224 of the stem 210. Note that, in the closed position shown in FIG. 1, the valve disk 212 has not moved and is still in full contact with the edges of the port 214. Therefore, as should be apparent, adjustment of the plunger 206 and/or stem 210 will typically not affect the position of the disk 212 in the closed position of the valve 211.

The view in FIG. 2 shows the solenoid 201 in an energized/activated configuration (e.g., coil 204 is energized). The plunger 206 is fully retracted against the stop member 203, and the coupling between the plunger 206 and coil 204 is unchanged by the adjustment of the stem/disk by distance 224. This adjustment 224 has caused a proportional decrease in a distance 226 between the disk 212 and port 214 in the open position of the valve 211. The maximum, unthrottled position of the disk 212 is represented by dashed line 228, and is offset between the dashed line 228 and disk 212 is generally the same as the distance 224 added by adjustment between the disk 212 and plunger 206.

In various embodiments of the invention, the throttling adjustment of member 225 is preferably capable of being set in the field by a technician. This generally means the adjustment can be made by hand (e.g., either with the fingers or with ordinary hand tools), and the adjustment preferably does not require any significant disassembly of the valve. In the illustrated example, the member 225 is externally accessible via hole 230, thereby facilitating field access. A cover (not shown) may be used to cover the hole to prevent foreign matter from entering the solenoid 201. Such a cover could also be field moved/removed by hand, and removal of a cover may not be considered as disassembly of the valve assembly 200 for purposes of throttling adjustments.

Figure 3:
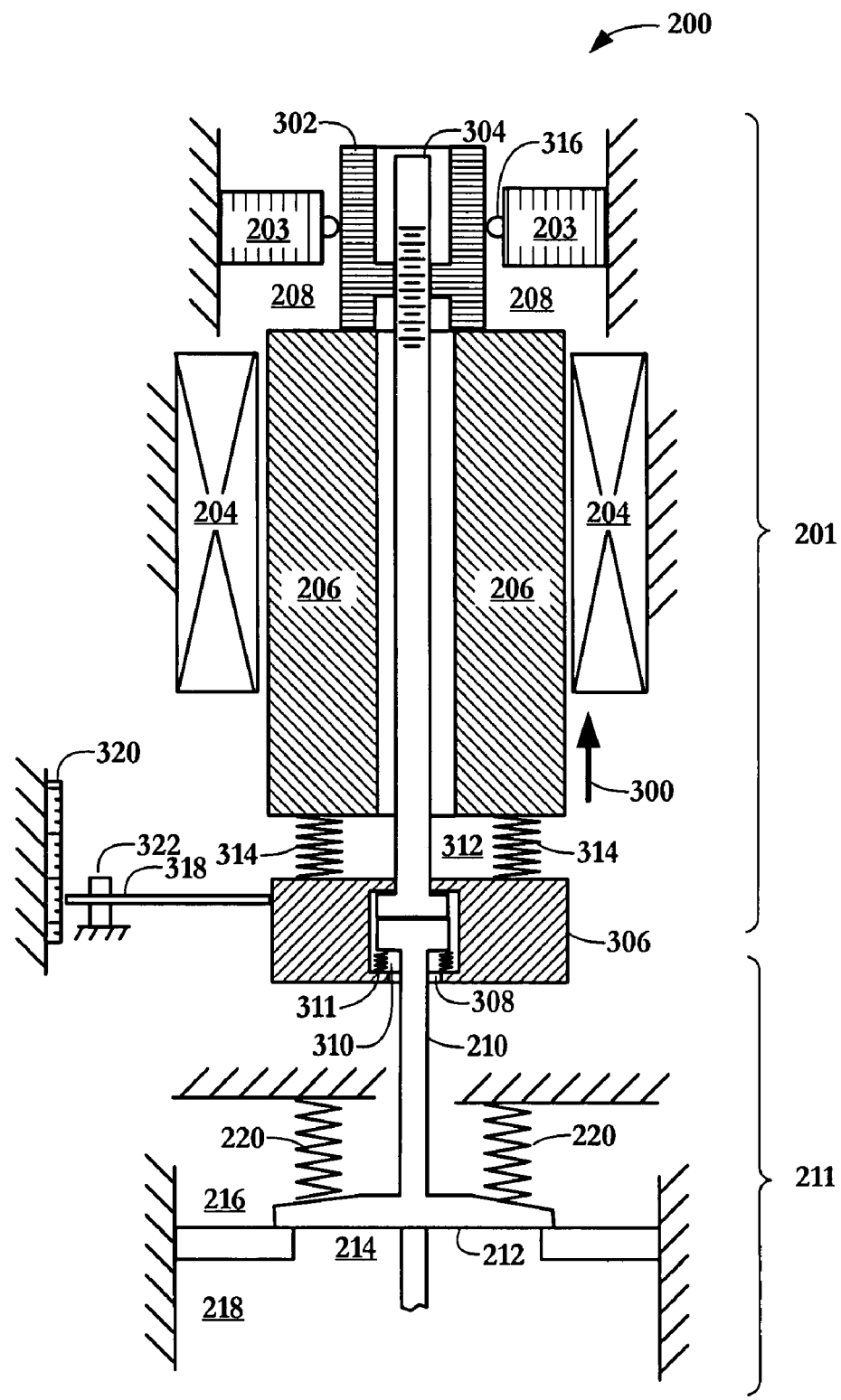
FIG. 3 is a cross-sectional block diagram of a shutoff valve and valve adjustment mechanism according to an embodiment of the invention.

An adjustable valve according to embodiments of the invention should be capable of being easily and safely adjusted (e.g., limiting the likelihood of heat or sparks near combustible gases) by a field technician. In reference now to FIG. 3, a schematic diagram illustrates a throttle adjustment mechanism for a shutoff valve 200 according to an embodiment of the invention. As was described in previous diagrams, a solenoid valve 200 includes a coil 204 and plunger 206 that can be linearly actuated by the coil 204 in the direction indicated by arrow 300 when current is applied to the coil 206.

The solenoid plunger 206 is coupled to a valve stem 210 and disk 212 that slidably opens and closes the port 214 as previously described. Because the valve disk 212 is shown sealing the port 214, the solenoid coil 204 in this diagram is in the de-energized state. As can be seen in this arrangement, the plunger 206 is not directly connected to the valve stem 210, but is coupled by an adjustment sleeve 302, and adjustment rod 304, and a coupling member 306. The plunger 206 butts against the adjustment sleeve 302 so that the plunger 206 pushes the sleeve upwards (in this orientation). There need be no fixable coupling between the plunger 206 and the sleeve 302, and the plunger 206 may be capable of decoupling from the sleeve when the plunger 206 moves downward relative to the sleeve 302. However, other components such as spring 314 may cause contact to be maintained between the plunger 206 and sleeve 302 under most conditions.

The adjustment sleeve 302 is adjustably coupled to the adjustment rod 304, e.g., via screw threads on the sleeve 302 and rod 304. The adjustment rod 304 is connected to the coupling member 306, preferably by a fixed connection (e.g., swaged, knurled, welded, bonded, etc). The coupling member 306 is pulled up by the solenoid plunger 206 pushing against the coupling sleeve 302 and rod 304 in direction 300 when the coil 204 is activated. The coupling member 306 in turn pulls up the valve stem 210 when the plunger 206 is moved upward. As indicated by the enlarged hole 308 in the coupling member 306 and the gap 310 between the coupling member 306 and stem 210, the coupling member 306 may disengage from the valve stem 210 when the solenoid plunger 206 is in the de-energized position. The gap 310 is optional and may help insure full closure of the disk 212 under variable conditions (e.g., temperature, slow moving or stuck plunger, etc). Further, the top of the valve stem 210 and the bottom of the rod 304 may be in contact, as illustrated, to ensure the valve disk 212 seats. A compression spring 311 may also be placed in the gap 310 between the member 306 and stem 210 to help maintain the gap 310 and allow for correct operation at positions other than upright.

When the solenoid coil 204 is energized, the solenoid plunger 206, sleeve 302, and rod 304 act to pull the coupling member 306 in direction 300. The coupling member 306 moves in direction 300 until the gap 310 is closed, and after which the stem 210 and disk 212 are pulled up in direction 300 and the valve port 214 is opened. As the coil 204 is energized, the spring 220 continues to exert a force on the disk 212 and stem 210 in a direction opposite to the valve opening direction 300. When the coil 204 is de-energized, the force of spring 220 pulls the valve components 210, 212 closed, and the other components 306, 304, 302, 206 are also pulled to the closed position.

The movement of the sleeve 302 relative to the rod 304 causes a change in a gap 312 between the solenoid plunger 206 and coupling member 306. A compression spring 314 provides a force that ensures the gap 312 remains opens in response to this adjustment. An increase in the gap 312 results in a decrease in gap 208 between the plunger 206 and stop member 203. The decrease in the gap 208 decreases the movement of the valve disk 212 and thereby throttles the opening at the port 214 when the valve is in the open position (e.g., when the plunger 206 is actuated by the activated coil 204). It may be appreciated that the sleeve 302 will move with the plunger 206, therefore the stop member 203 may require a bearing/sealing surface for the sleeve 302, as represented by bearing 316. The bearing 316 may be a material coating or additional element (e.g., seal) that reduces friction between the sleeve 302 and surrounding surfaces 203, and prevents foreign matter from entering the valve assembly 200.

It will be appreciated that the adjustments between the rod 304 and the sleeve 302 may be made by turning either one of the sleeve 302 or rod 304. In the illustrated embodiments, the rod 304 is rigidly fixed to the coupling member 306, thus adjustments are made by turning the sleeve 302. The opposite arrangement is also possible. The adjustments to the rod 304 or sleeve 302 can be made in either the open or closed positions of the valve assembly 200.

One issue faced by a field technician is how much to throttle the valve 200. In some cases, a pressure or flow meter may be attached to the flow lines and the valve throttle adjustments made while the valve 200 is in the open position, until the readings are at a desired level. Similar adjustments might be made without separate measuring equipment, such as by observing system performance, in particular the performance of other equipment coupled to the fluid supply lines. However it may be desirable to provide the technician with an estimated starting point with which to throttle the valve 200. In many installations, this "rough adjustment" may be all that is needed to achieve desired performance. In the illustrated diagram, an indicator 318 and scale 320 provide a way to assist in making such a valve adjustment.

The indicator 318 is shown affixed to the coupling member 306 and the scale 320 may be affixed to any non-moving part of the valve assembly 200. The juxtaposition of the indicator 318 with the scale 320 is externally visible and provides an indication of whether the moving valve parts 210, 212 are in an open or closed position. Further, when the valve 200 is energized, an adjustment of the sleeve 302 or rod 304 will cause movement of the coupling member 306, and therefore be reflected in the indicator components 318, 320. In this way, a field technician can provide an initial throttling adjustment by actuating the valve 200 and adjusting the sleeve 302 until the indicator components 318, 320 read a predetermined value. This adjustment can be made even before the valve 200 is mounted and/or or connected to fluid lines.

The indicator 318 may also perform a second function, that of an anti-rotation member. In many applications, the movable parts such as the plunger 206, sleeve 302, rod 304 etc., may be able to rotate along an axis aligned with the direction 300 of valve movement. If the rod 304 (or sleeve 302 in a configuration where the sleeve 302 is fixed and rod 304 is movable) isn't constrained against rotation, it may be difficult or impossible to adjust the movable component. As was previously described, the rod 304 is fixably coupled to the coupling member 306, and the indicator 318 is fixably coupled to the coupling member 306. Therefore, one or more rotational stops 322 may be arranged to interfere with rotation of the indicator 318, thereby preventing the rod 304 from turning during adjustment.

Figure 4:
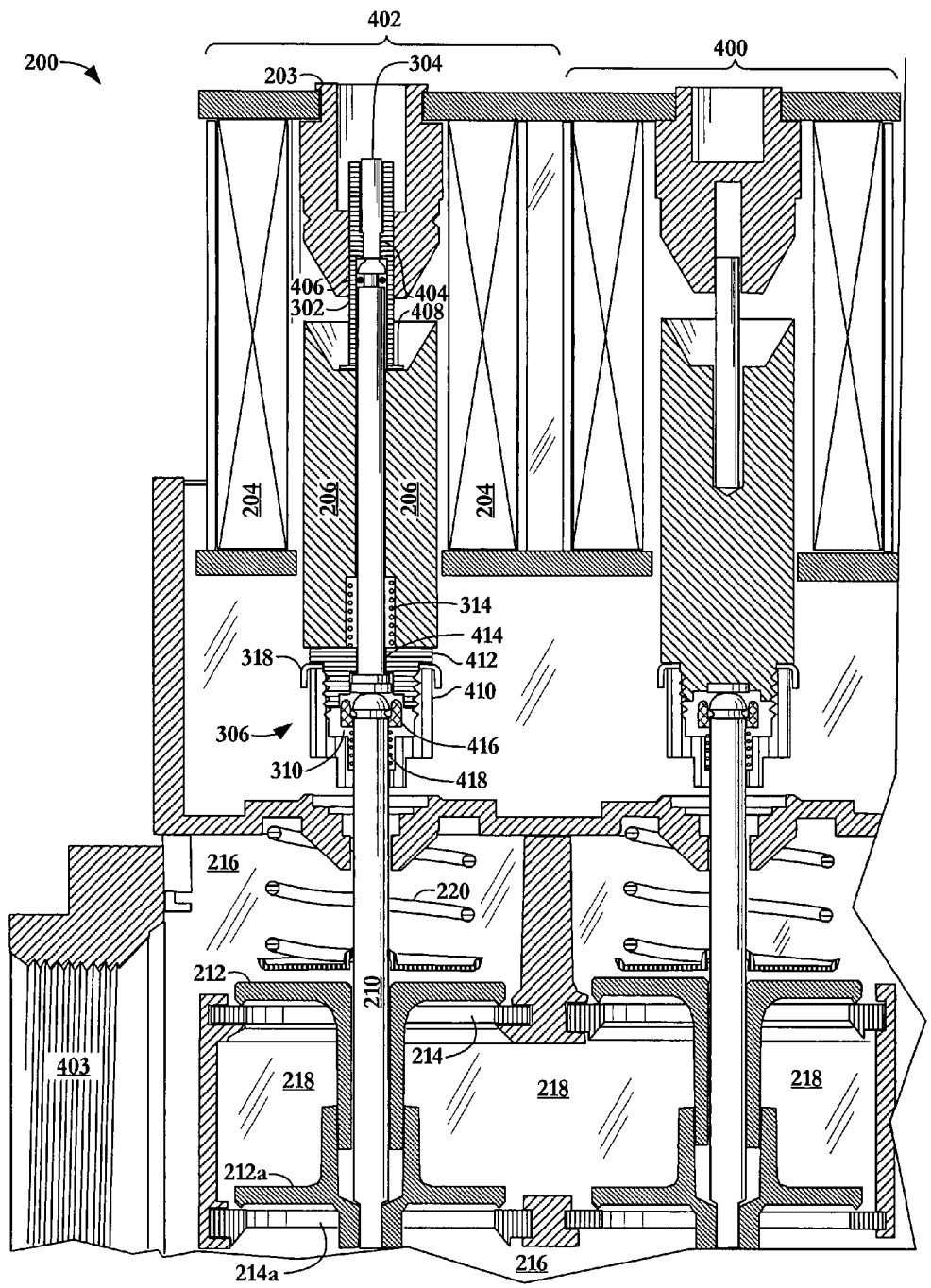
FIG. 4 is a cross-sectional block diagram of a shutoff valve and valve adjustment mechanism according to another embodiment of the invention.

In reference now to FIG. 4, a cross sectional diagram shows additional details of valve assembly 200 according to an embodiment of the invention. In the illustrated configuration, the valve assembly 200 is adjusted for maximum flow. As with other embodiments, this valve assembly 200 includes a movable disk 212 coupled to a stem 210, the disk 212 slidably engageable to block a port 214. This example further includes a second disk 212a that blocks a second port 214a. The second disk 212a is also coupled to the stem 210 so that disks 212, 212a move in unison. The arrangement of the disks 212, 212a on respective ports 214, 214a results in a zero net force being applied on the disks 212, 212a by a pressure differential between chambers 216, 218 when the valve 200 is closed. An external fluid carrying element (e.g., pipe, conduit) is coupled to one of the chambers 216 by way of a threaded inlet/outlet port 403. The other chamber 218 is coupled to a different inlet/outlet port (not shown).

The illustrated valve assembly 200 includes a second shutoff stage 400. This second stage 400 may be provided to acts as a safety backup to the adjustable valve portion, represented as here as first stage 402. In a safety shutoff application, both stages 400, 402 may operate in unison (e.g., coils may be wired in parallel) although other arrangements are conceivable. The second stage 400 need not include any throttling features, although it will be appreciated that there may be some applications where it is advantageous to include throttling features in the second stage 400 as well, and/or to make the second stage 400 operate independently of the first stage 402. For example, if stages 400, 402 are both adjustably throttled and operated independently, the valve assembly 200 could provide three levels of throttling (e.g., Level 1-stage 402 opened; Level 2-stage 400 opened; Level 3-both stages 400, 402 opened).

In the illustrated embodiment, the adjustment rod 304 interfaces with the sleeve 302 via a threaded portion 404. A sealing member 406 is disposed between the adjustment rod 304 and sleeve 302. This sealing member 406 may provide additional friction between the components 302, 304 so that the adjustment doesn't change over time (e.g., help prevent threads 404 from become loosened and moving due to movements of the plunger 206). Also seen in this view is a washer 408 between the plunger 206 and sleeve 302. The washer 408, sleeve 302, and adjustment rod 304 are preferably made of non-magnetic materials (e.g., brass, aluminum) to prevent interfering with the operation of the plunger 206 and coil 204.

The coupling member 306 in this embodiment is made of two components, a cup 410 and a plug 412. The cup and plug 410, 412 are threaded together, thereby trapping the ends of the adjustment rod 304 and the valve stem 210. The cup and plug 410, 412 also hold the indicator/anti-rotation member 318, which extends in a direction perpendicular to the page where it can interface with a scale and/or stops. The adjustment rod 304 may be fixably attached to the plug 412, as indicated by fixed interface 414. The valve stem 210 is held in place via a stop ring 416 and spring 311. The stop ring 416 may be held in place on the stem 210 by an element such as a snap ring, spring clip, etc.

Figure 5:
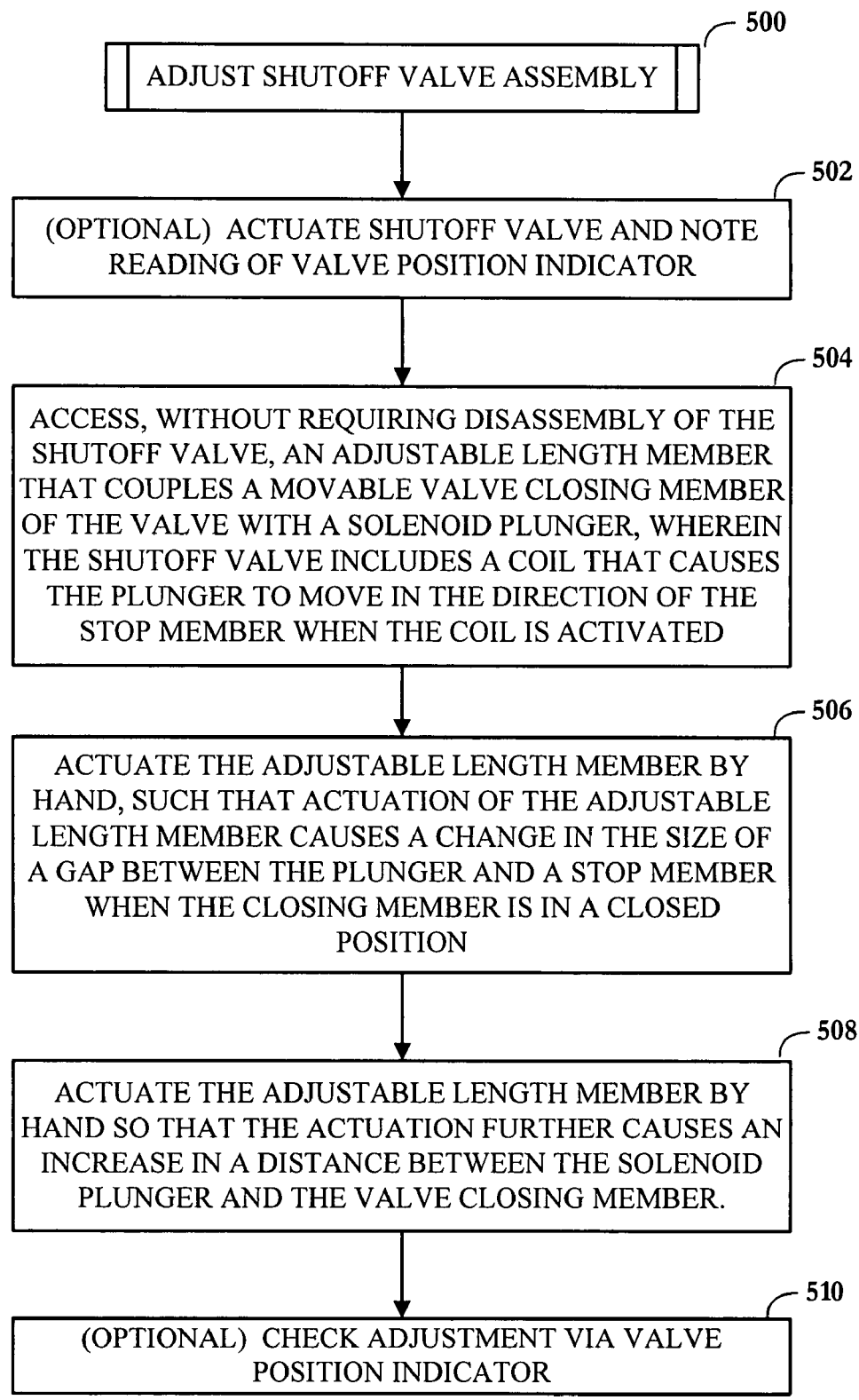
FIG. 5 is a flowchart illustrating a procedure according to an embodiment of the invention.

A gas valve assembly according to embodiments of the invention may be used in any type of application, including new installations, retrofits, and/or repairs. In reference now to FIG. 5, a flowchart illustrates a shutoff valve adjustment procedure 500 according to an embodiment of the invention. Where the shutoff valve includes a valve position indicator, the valve may be actuated 502 and the position noted via the valve position indicator. Without requiring disassembly of the shutoff valve, an adjustable length member is accessed 504. The adjustable length member couples a movable valve-closing member of the valve with a solenoid plunger, and the shutoff valve includes a coil that causes the solenoid plunger to move in the direction of the stop member when the coil is activated.

The adjustable length member is actuated 506 by hand, such that actuation of the adjustable length member causes a change in the size of a gap between the plunger and a stop member when the closing member is in a closed position. The adjustable length member is also actuated 508 by hand such that actuation of the adjustable length member further causes an increase in a distance between the solenoid plunger and the valve-closing member. If a valve position indicator is in use, the adjusted position may be checked 510.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A gas valve assembly, comprising:
a solenoid having a coil, a linearly actuated plunger, and a stop member, wherein the plunger is disposed in the coil so that a gap exists between the plunger and the stop member at a de-energized condition of the solenoid, and wherein the stop member contacts the plunger at an energized condition of the solenoid;
a valve comprising a port and a closing member, wherein the closing member is disposed to block the port in a closed position of the valve corresponding to the de-energized condition of the solenoid, and wherein the closing member is disposed to slidably unblock the port in an open position of the valve corresponding to the energized condition of the solenoid;
an adjustable length member coupled to the closing member and the plunger, the adjustable length member comprising:
a rotating portion and a fixed portion, the rotating portion coupled to the fixed portion via a screw thread;
a portion accessible externally of the valve assembly, wherein the externally-accessible portion is adjustable by rotating the rotating portion relative to the fixed portion to vary a distance between the plunger and the closing member and thereby adjusting a gap between the closing member and the port when the valve is in the open position;
an anti-rotation member coupled to the fixed portion, the anti-rotation member hitting against one or more stops when the rotating portion is rotated relative to the fixed portion; and
an indicator coupled to the fixed portion and that is visible externally to the valve assembly; and
a fixed scale proximate to the indicator, wherein the relative orientation between the indicator and the fixed scale provides an indication of a position of the closing member of the valve.

2. A gas valve assembly, comprising:
a solenoid having a coil, a linearly actuated plunger, and a stop member, wherein the plunger is disposed in the coil so that a gap exists between the plunger and the stop member at a de-energized condition of the solenoid, and wherein the stop member contacts the plunger at an energized condition of the solenoid;
a valve comprising a port and a closing member, wherein the closing member is disposed to block the port in a closed position of the valve corresponding to the de-energized condition of the solenoid, and wherein the closing member is disposed to slidably unblock the port in an open position of the valve corresponding to the energized condition of the solenoid;
an adjustable length member coupled to the closing member and the plunger, the adjustable length member comprising:
a portion accessible externally of the valve assembly, wherein the externally-accessible portion is adjustable to vary a distance between the plunger and the closing member and thereby adjusting a gap between the closing member and the port when the valve is in the open position;
a coupling member coupled to move the closing member in a first direction, wherein the first direction corresponds to a direction the closing member moves when transitioning from the closed position to the open position;
a first adjustable member fixably coupled to the coupling member;
a second adjustable member coupled to move the first adjustable member in both the first direction and a second direction that is opposite to the first direction, wherein the plunger is coupled to move the second adjustable member only in the first direction, wherein the relative orientation between the first and second adjustable members in the first and second directions is manually adjustable externally to the gas valve assembly.

3. The gas valve assembly of claim 2, further comprising a compression spring disposed between the coupling member and the plunger.

4. The gas valve assembly of claim 2, wherein the coupling member is at least partially decoupled from the closing member by a gap between the coupling member and the closing member when the valve is in the closed position.

5. The gas valve assembly of claim 2, wherein the coupling member is at least partially decoupled by a gap between the coupling member and the closing member when the valve is in the closed position.

6. The gas valve assembly of claim 2, wherein the second adjustable member comprises a sleeve, and wherein the first adjustable member comprises a rod axially disposed in the sleeve, wherein the sleeve and rod are coupled via screw threads.

7. The gas valve assembly of claim 6, wherein the relative orientation between the first and second adjustable members in the first and second directions is adjustable by rotating the sleeve relative to the rod around an aligned longitudinal axis of the sleeve and the rod.

8. The gas valve assembly of claim 7, further comprising an anti-rotation member coupled to the coupling member, the anti-rotation member hitting against one or more stops when the sleeve is rotated relative to the rod.

9. The gas valve assembly of claim 8, wherein the anti-rotation member is visible externally to the valve assembly, the valve assembly further comprising a fixed scale proximate to the anti-rotation member, wherein the relative orientation between the anti-rotation member and the fixed scale provides an indication of a position of the closing member of the valve.

10. The gas valve assembly of claim 2, wherein the externally-accessible portion is adjustable at the de-energized condition of the solenoid to vary the distance between the plunger and the closing member.

11. An apparatus, comprising:
a closing member of a shutoff valve;
plunger configured to be disposed in a solenoid coil so that a gap exists between the plunger and a stop member at a de-energized condition of the solenoid coil, and wherein the plunger contacts the stop member at an energized condition of the solenoid coil;
a coupling member coupled with the closing member of the shutoff valve so that the closing member moves in a first direction when the coupling member is moved in the first direction, wherein the first direction corresponds to a direction the shutoff valve moves when transitioning from a closed position to an open position of the shutoff valve, and wherein the coupling member and the closing member are at least partially decoupled by a gap between the coupling member and the closing member when the shutoff valve is in the closed position;

a first adjustable member coupled to the coupling member so that the coupling member moves in the first direction when the first adjustable member is moved in the first direction;

a second adjustable member coupled to move the first adjustable member in both the first direction and a second direction opposite to the first direction, wherein the second adjustable member is coupled to be moved by the plunger only in the first direction, wherein the relative orientation between the first and second adjustable members in the first and second directions is manually and externally adjustable to vary a distance between the plunger and the closing member and thereby adjusting a gap between the closing member and a port when the shutoff valve is in the open position.

12. The apparatus of claim 11, further comprising a compression spring disposed between the coupling member and the plunger.

13. The apparatus of claim 11, wherein the second adjustable member comprises a sleeve, and wherein the first adjustable member comprises a rod axially disposed in the sleeve.

14. The apparatus of claim 13, wherein the rod is coupled to the sleeve via a screw thread, and wherein the relative orientation between the first and second adjustable members in the first and second directions is adjustable by rotating the sleeve along a longitudinal axis of the sleeve relative to the rod.

15. A method of adjusting a shutoff valve, comprising:

causing a solenoid plunger of the shutoff valve to open the shutoff valve, wherein the shutoff valve includes a port and a closing member, and wherein a gap exists between the port and the closing member in an open position of the shutoff valve;

with the closing member in the open position, performing:
accessing an adjustable length member that couples the closing member with the solenoid plunger, wherein the adjustable length member is accessible without requiring disassembly of the shutoff valve;

actuating the adjustable length member by hand to move a rotating portion of the adjustable length member relative to a fixed portion of the adjustable length member via a screw thread and thereby adjust the gap between the closing member and the port in the open position, wherein the fixed portion comprises: a) an anti-rotation member that hits against one or more stops to prevent rotation of the fixed portion when the adjustable length member is actuated; and b) an indicator that is visible externally to the valve assembly; and viewing a relative orientation of the indicator to a fixed scale in response to the actuation of the adjustable length member, wherein the relative orientation between the indicator and the fixed scale provides an indication of a position of the closing member of the valve to facilitate adjusting a throttle of the shutoff valve.

16. The gas valve assembly of claim 1, wherein the externally-accessible portion is adjustable at the de-energized condition of the solenoid to vary the distance between the plunger and the closing member.

17. The gas valve assembly of claim 1, wherein the valve comprises a poppet-style valve.

18. The gas valve assembly of claim 2, wherein the valve comprises a poppet-style valve.

19. The apparatus of claim 11, wherein the shutoff valve comprises a poppet-style valve.

20. The method of claim 15, wherein the shutoff valve comprises a poppet-style valve.

* * * * *